Patented Nov. 7, 1944

2,362,049

UNITED STATES PATENT OFFICE 2,362,049

METHOD OF PREPARING ALPHA-ARYL ACRYLONITRILES

Albert M. Clifford, Stow, and John R. Long, Akron, Ohio, assignors to Wingfoot Corporation, Akron, Ohio, a corporation of Delaware No Drawing. Application July 9, 1940, Serial No. 344,546

12 Claims. (Cl. 260—465)

This invention relates to an improved method of making alpha aromatic acrylonitriles and to polymers which may be prepared by their use. More particularly, it relates to a method of preparing alpha phenyl acrylonitrile and to polymers containing the same.

Among monomeric materials which have been polymerized to yield masses having various useful properties are styrene and acrylonitrile, one of which contains a benzene ring and the other of which contains a cyano group. It appeared possible that a compound, the formula of which had a configuration combining the characteristic features of both styrene and acrylonitrile might be readily polymerizable to yield valuable materials. Accordingly, alpha phenyl acrylonitrile, containing a benzene ring and a cyano group, was tested and was found to polymerize readily with other monomers, such as butadiene, isoprene, and dimethyl butadiene, to give plastic masses. Likewise, related compounds in which the phenyl group in the position alpha to the cyano radical is replaced by other aromatic rings, such as aryl groups and substituted aryl groups, are useful for this purpose.

However, no good method was known of preparing these materials and the present invention is concerned with the provision of such a method which yields the monomer readily in satisfactory amounts. The starting material is acetophenone or a homolog or analog of acetophenone, such as tolyl methyl ketone, chlorophenyl methyl ketone, bromophenyl methyl ketone, anisyl methyl ketone, phenethyl methyl ketone, xylyl methyl ketone, cumyl methyl ketone, naphthyl methyl ketone and similar methyl ketones, the preferred class being those in which the aromatic ring is unsubstituted or is substituted by alkyl, alkoxy or halogen groups. In accordance with the method of the invention, acetophenone, for example, is treated with hydrogen cyanide to obtain acetophenone cyanhydrin. It is not feasible to remove the elements of water from this intermediate to leave the alpha phenyl acrylonitrile. It was discovered, however, that the introduction of an acetate group into the molecule of the acetophenone cyanhydrin and subsequent removal of this group resulted in the production of the desired compound. The reactions involved are illustrated by the following equations:

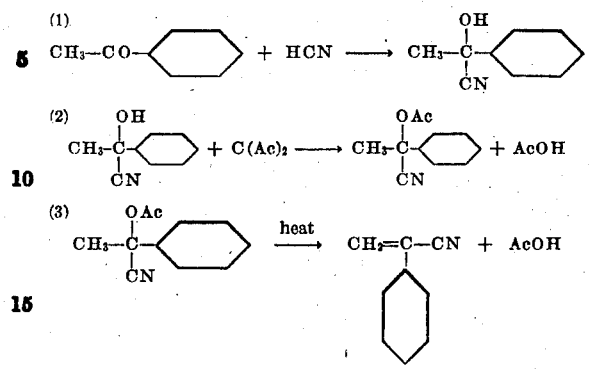

It is important to maintain the pressure as low as possible during distillation to avoid polymerization of the product. Pressures between about 10 and 60 mm./Hg have been found to be satisfactory but only practical considerations fix a lower pressure limit; however, it has been definitely established that the pressure should not exceed 200 mm./Hg.

Example 1

Commencing with the acetophenone as the primary reaction material, the method can be carried out in the following manner: Into 720.6 grams of acetophenone containing a pinch of NaCN is passed 165 grams of hydrogen cyanide. When this amount of gas has been absorbed, the reaction product is acetylated with 612 grams of acetic anhydride containing 0.5 cc. of concentrated sulfuric acid. Distillation under reduced pressure resulted in recovery of about one half of the acetophenone used and 365 grams of the acetate of acetophenone cyanhydrin. This acetate has a boiling point of 150–160° C. under a pressure corresponding to 6 mm. of Hg and an index of refraction $n^{27}{}_D = 1.5060$. One hundred grams of the acetate of acetophenone cyanhydrin or, as it may be termed, alpha cyano. alpha phenyl ethyl acetate, is then passed in 40 minutes through the reaction zone of a furnace, the reaction zone having a capacity of about 150 cc. and being filled with copper turnings. The pressure was maintained at about 10–12 mm./Hg and the temperature was between about 510–520° C. A polymerization inhibitor was added to the product of this pyrolysis, hydroquinone or phenyl beta naphthylamine being suitable, and the product was distilled under reduced pressure to yield acetic acid, 17.4 grams of the alpha phenyl acrylonitrile and 36.8 grams of unreacted acetate of acetophenone cyanhydrin. Further conversion is obtained by again passing the unreacted material through the furnace. The alpha phenyl acrylonitrile thus produced had a boiling point of 99–103° C. at 10 mm./Hg, a density of $d_{22}=1.0256$ and an index of refraction $n^{28}_D=1.5475$.

Of course, the conditions given in the foregoing example may be modified in various respects, for example, the acetic anhydride may be replaced by other acetylating agents, such as acetyl chloride, acetic acid plus sulfuric or phosphoric acid, ketene, etc. The temperature during pyrolysis may vary between 500–600° C., more or less, and other contact materials than copper may be present in the furnace. Likewise, the pressure during the de-acetylation may be varied from the lowest practically attainable up to as high as 200 mm./Hg, the object being to avoid polymerization of the product. The preferred range of pressures is from 10 to 60 mm./Hg, these being about as low as it is possible to attain under practical conditions. The same is true of the conditions under which the distillation of the product is carried on, a low pressure being requisite here, also, to avoid polymerization.

The material obtained in the foregoing example was then tested for its polymerizing properties. Thus, a mixture of 9.6 grams of butadiene and 6.4 grams of alpha phenyl acrylonitrile, containing 0.48 gram of $CCl_4$, was emulsified in 20 cc. of an aqueous solution containing 2.5% of Aquarex D (sodium sulfate ester of higher alcohols), 1.33 grams of sodium perborate and a citrate-phosphate buffer providing a final hydrogen ion concentration of pH 5.2. The emulsion was agitated at a temperature of 50° C. for a period of three days. At the end of that time, the copolymer was precipitated with alcohol and dried.

The conditions of the polymerization just described can be varied, as will be apparent. Other promoters, such as ethylene dichloride, or chloro benzene, chloropropionitrile, chloroform, may be substituted for the carbon tetra chloride, the Aquarex D emulsifying agent may be replaced by other emulsifying agents, such as sodium oleate, sodium naphthalene sulfonate, triethanolamine oleate and oxidizing agents other than sodium perborate, may be employed such as Na peroxide, hydrogen peroxide, ammonium persulfate, acetyl peroxide and tertiary butyl hydro peroxide. Of course, other buffers giving other hydrogen ion concentrations may also be used, examples being phosphate-acetate, phosphate-tartrate, tartrate alone, citrates, etc. The temperature of polymerization may vary from 30–80° C. with an optimum in the neighborhood of 50° C.

The acrylonitriles in which the alpha position to the cyano radical is substituted by an aromatic group are new compounds, those in which the substituent is a phenyl, alkyl phenyl, alkoxy phenyl or halogen phenyl being especially useful as monomers for the preparation of polymerized materials.

While only the preferred form of the invention has been described in detail, it will be apparent to those skilled in the art that various modifications may be made therein without departing from the spirit of the invention or the scope of the appended claims in which it is intended to cover by features of patentable expression all suitable novelty residing in the invention.

What we claim is:

1. A method of preparing acrylonitriles containing an aromatic substituent in the alpha position which comprises treating the corresponding aromatic methyl ketone with hydrogen cyanide, acetylating the cyanhydrin so formed and then de-acetylating the acetate to produce the alpha aromatic substituted acrylonitrile.

2. A method of preparing acrylonitriles in which the alpha position carries a substituent from the group consisting of phenyl, alkylphenyl, alkoxyphenyl and halogen phenyl which comprises treating the corresponding aromatic methyl ketone with hydrogen cyanide, acetylating the cyanhydrin so formed and then deacetylating the acetate to produce the alpha substituted acrylonitrile.

3. In a method of preparing acrylonitriles containing an aromatic substituent in the alpha position, the step which comprises de-acetylating the corresponding alpha cyano alpha aromatic ethyl acetate.

4. A method of preparing alpha phenyl acrylonitrile which comprises treating acetophenone with hydrogen cyanide, acetylating the cyanhydrin so formed and then heating the acetate to decompose the same into alpha phenyl acrylonitrile and acetic acid.

5. A method of preparing alpha phenyl acrylonitrile which comprises treating acetophenone with hydrogen cyanide, acetylating the cyanhydrin so formed and then heating the acetate to a temperature between about 500° and 600° C. to decompose the same into alpha phenyl acrylonitrile and acetic acid.

6. A method of preparing alpha phenyl acrylonitrile which comprises reacting acetophenone cyanhydrin with acetic anhydride to form the acetate thereof and then heating the acetate to decompose the same into alpha phenyl acrylonitrile and acetic acid.

7. In a method of preparing alpha phenyl acrylonitrile, the step which comprises heating alpha cyano alpha phenyl ethyl acetate to decompose the same into alpha phenyl acrylonitrile and acetic acid.

8. In a method of preparing alpha phenyl acrylonitrile, the step which comprises heating alpha cyano alpha phenyl ethyl acetate to a temperature between about 500° and 600° C. to decompose the same into alpha phenyl acrylonitrile and acetic acid.

9. In a method of preparing alpha phenyl acrylonitrile, the step which comprises heating alpha cyano alpha phenyl ethyl acetate to a temperature between about 500° and 600° C. under a pressure corresponding to between about 10 and 60 mm. of mercury.

10. In a method of preparing alpha phenyl acrylonitrile, the step which comprises heating alpha cyano alpha phenyl ethyl acetate to a temperature between about 510 and 520° C. under a pressure corresponding to between about 10 and 12 mm. of mercury.

11. A method of preparing alpha phenyl acrylonitrile which comprises treating acetophenone with hydrogen cyanide, reacting the acetophenone cyanhydrin with acetic anhydride to form the acetate thereof and then heating the acetate to a temperature between about 500° and 600° C. under a pressure corresponding to between about 10 and 60 mm. of mercury to decompose the same into alpha phenyl acrylonitrile and acetic acid.

12. A method of preparing alpha phenyl acrylonitrile which comprises treating acetophenone with hydrogen cyanide, reacting the acetophenone cyanhydrin with acetic anhydride to form the acetate thereof and then heating the acetate to a temperature between about 500 and 600° C. under a pressure corresponding to between about 10 and 60 mm. of mercury to decompose the same into alpha phenyl acrylonitrile and acetic acid and then distilling in the presence of a polymerization inhibitor to obtain the alpha phenyl acrylonitrile.

ALBERT M. CLIFFORD.
JOHN R. LONG.